United States Patent [19]
Barlage, III et al.

[11] Patent Number: 5,784,279
[45] Date of Patent: Jul. 21, 1998

[54] APPARATUS FOR MAKING THREE-DIMENSIONAL ARTICLES INCLUDING MOVING BUILD MATERIAL RESERVOIR AND ASSOCIATED METHOD

[75] Inventors: William Berdell Barlage, III, Easley; Manuel Michael Ferreira, Simpsonville, both of S.C.

[73] Assignee: BPM Technology, Inc., Greenville, S.C.

[21] Appl. No.: 536,670

[22] Filed: Sep. 29, 1995

[51] Int. Cl.$^6$ ................................................ G06F 19/00
[52] U.S. Cl. .................................. 364/468.26; 425/375
[58] Field of Search ...................... 364/468.01, 468.25, 364/468.26, 474.24; 395/118–120; 425/135, 375; 264/22, 40.1, 241, 308; 347/1

[56] References Cited

U.S. PATENT DOCUMENTS

| | | | |
|---|---|---|---|
| 3,949,125 | 4/1976 | Roberts | 428/99 |
| 4,247,508 | 1/1981 | Housholder | 264/219 |
| 4,573,330 | 3/1986 | Hull | 425/174.4 |
| 4,665,492 | 5/1987 | Masters | 364/468 |
| 4,684,962 | 8/1987 | Hirosawa et al. | 346/140 R |
| 4,749,347 | 6/1988 | Valavaara | 425/135 |
| 4,882,597 | 11/1989 | Sugiyama | 346/140 R |
| 5,031,120 | 7/1991 | Pomerantz et al. | 364/522 |
| 5,038,014 | 8/1991 | Pratt et al. | 219/121.64 |
| 5,059,266 | 10/1991 | Yamane et al. | 156/64 |
| 5,121,329 | 6/1992 | Crump | 364/468 |
| 5,126,529 | 6/1992 | Weiss et al. | 219/121.6 |
| 5,128,235 | 7/1992 | Vassiliou et al. | 430/322 |
| 5,134,569 | 7/1992 | Masters | 364/474.24 |
| 5,136,515 | 8/1992 | Hellinski | 364/468 |
| 5,140,937 | 8/1992 | Yamane et al. | 118/695 |
| 5,141,680 | 8/1992 | Almquist et al. | 264/22 |
| 5,149,548 | 9/1992 | Yamane et al. | 425/174.4 |
| 5,192,559 | 3/1993 | Hull et al. | 425/89 |
| 5,204,055 | 4/1993 | Sachs et al. | 419/2 |
| 5,204,124 | 4/1993 | Secretan et al. | 425/145 |
| 5,207,371 | 5/1993 | Prinz et al. | 228/125 |
| 5,216,616 | 6/1993 | Masters | 364/474.24 |
| 5,257,657 | 11/1993 | Gore | 164/46 |
| 5,260,009 | 11/1993 | Penn | 264/40.1 |
| 5,287,435 | 2/1994 | Cohen et al. | 395/118 |

(List continued on next page.)

FOREIGN PATENT DOCUMENTS

| | | | |
|---|---|---|---|
| 0 420 614 | 4/1991 | European Pat. Off. | B05D 7/02 |
| 0 606 627 | 7/1994 | European Pat. Off. | B29C 67/00 |
| 9301634 | 9/1993 | Netherlands | B43L 13/00 |
| 92/08200 | 5/1992 | WIPO | G06F 15/46 |
| 92/18323 | 10/1992 | WIPO | B29C 67/02 |
| 95/05943 | 3/1995 | WIPO | B41J 2/01 |
| WO96/12610 | 5/1996 | WIPO | B29C 67/00 |

*Primary Examiner*—Paul P. Gordon
*Assistant Examiner*—Steven R. Garland
*Attorney, Agent, or Firm*—Allen, Dyer, Doppelt, Milbrath & Gilchrist, P.A.

[57] ABSTRACT

A three-dimensional article making apparatus includes a first positioner for positioning a build material jetting head along a first direction, a second positioner for positioning the first positioner along a second direction so that the jetting head is effectively positionable along the second direction as well, and a build material reservoir being mounted on the first positioner so that a flexible connecting tube need only flex to accommodate positioning of jetting head along the first direction but not along the second direction. The jetting head may be a piezoelectric jet which operates by forming a negative meniscus at an orifice of jet between droplets. Accordingly, the build material reservoir may be mounted vertically relative to the piezoelectric jet to form the negative meniscus by negative head pressure. The apparatus preferably includes a solid build material supply mounted on an apparatus frame for storing build material in solid form. The first and second positioners may be used for selectively positioning the build material reservoir adjacent the solid build material supply to replenish build material within the build material reservoir. In addition, a build material level sensor may be provided for initiating replenishment of the build material reservoir responsive to a low level of build material. Related methods are also disclosed.

41 Claims, 6 Drawing Sheets

U.S. PATENT DOCUMENTS

| | | | |
|---|---|---|---|
| 5,301,415 | 4/1994 | Prinz et al. | 29/458 |
| 5,301,863 | 4/1994 | Prinz et al. | 228/33 |
| 5,303,141 | 4/1994 | Batchelder et al. | 364/149 |
| 5,340,433 | 8/1994 | Crump | 156/578 |
| 5,402,351 | 3/1995 | Batchelder et al. | 364/468 |
| 5,506,607 | 4/1996 | Sanders, Jr. et al. | 347/1 |
| 5,529,471 | 6/1996 | Khoshevis | 425/375 |
| 5,572,431 | 11/1996 | Brown et al. | 364/468.01 |

APPARATUS FOR MAKING THREE-DIMENSIONAL ARTICLES INCLUDING MOVING BUILD MATERIAL RESERVOIR AND ASSOCIATED METHOD

FIELD OF THE INVENTION

The invention relates to an apparatus and related method for making a three-dimensional article, and, more particularly, to an apparatus and method using a positionable dispensing head to construct a three-dimensional article based upon article defining data.

BACKGROUND OF THE INVENTION

In the design and manufacture of a three-dimensional article, it is common practice to first create an initial design and then manually produce a custom prototype, or model, of the article based upon the initial design. After reviewing the initial prototype, design revisions are often made requiring the production of yet another prototype. This process of review and redesign may be repeated a number of times before finding the desired design thereby requiring a number of iterative steps to produce a single finished article. Accordingly, the process of designing and prototyping an article may involve considerable time, effort and expense.

Computer aided design (CAD) is commonly used for automating the design process. With the aid of a suitable computer, an operator is able to design a three-dimensional article and display the design on a two-dimensional medium, such as a display screen or paper. A significant advance in the art of three-dimensional design and modeling is disclosed in U.S. Pat. No. 4,665,492 to Masters entitled "Computer Automated Manufacturing Process and System." This patent discloses an apparatus including a positionable ejection head for ballistically emitting small mass particles to construct a three-dimensional article based upon article defining data. In other words, the patent discloses the advantageous combination of CAD with an apparatus for precisely constructing the article based upon the generated CAD data.

Another method and apparatus for forming three-dimensional objects is disclosed in U.S. Pat. No. 5,136,515 to Helinski entitled "Method and Means for Constructing Three-Dimensional Articles by Particle Deposition." This patent discloses a device including two positionable jetting heads with two feeder lines connected to respective remote sources of melted wax, for example, to provide both object and support material. Similarly, U.S. Pat. No. 5,260,009 to Penn entitled "System, Method, and Process for Making Three-Dimensional Dimensional Objects" discloses yet another apparatus for forming three-dimensional articles wherein a second or support material is dispensed with each layer of the three-dimensional article as it is formed, and wherein feeder lines provide a source of the liquid material to the positionable jetting head.

The formation of three-dimensional articles by jetting a photosetting or thermosetting material is disclosed in U.S. Pat. No. 5,059,266 to Yamane et al. entitled "Apparatus and Method for Forming Three-Dimensional Article." A jet sequentially or intermittently jets the photosetting or thermosetting material in a droplet form along a flight path to a stage on which the article is constructed. The jet is supplied liquid material via pumps, feeder lines, and material storage tanks.

Another apparatus and method for forming three-dimensional articles from a material which is normally solid, but flowable when heated, is disclosed, for example, in U.S. Pat. No. 5,141,680 to Almquist et al. The apparatus includes a positionable nozzle which is connected, via a flexible tube, to a supply of material separated from the nozzle. U.S. Pat. No. 5,134,569 to Masters entitled "System and Method for Computer Automated Manufacturing Using Fluent Material" discloses an apparatus which extrudes a curable material from a movable extrusion head. The extrusion head is supplied with build material from a flexible tube, in turn, connected to a pressurized container mounted to the apparatus frame.

Also relating to extrusion for article construction, U.S. Pat. No. 4,749,347 to Valavaara entitled "Topology Fabrication Apparatus" discloses an apparatus for extruding a plastic material in successive vertically extending layers to thereby form a solid body having a predetermined topology. The solid body is thereafter subjected to a smoothing and finishing operation. In particular, a relatively large heated reservoir for the plastic material is carried by an arm that is movable relative to the apparatus base by a first linear positioner. The extrusion head includes a gate which may be moved vertically to vary the height of the strip of material being extruded and may be tilted to provide the upper edge of extruded material with an angled surface.

The extrusion approach to manufacturing of a three-dimensional article may be limited by the accuracy of the finished article. In addition, the extrusion head may have a relatively large inertia, and, thus, be difficult to quickly and accurately reposition. This difficulty may be particularly evident wherein a relatively large container of material is carried by a moving portion as in the apparatus of U.S. Pat. No. 4,749,347 described above.

A conventional jet or jetting head may require a constant, uninterrupted, supply of liquid build material delivered thereto. If the supply is interrupted, the processor or controller may still continue to position and attempt to fire the jet. However, a portion of the article may fail to be formed while the flow of material is interrupted. In particular, a partial disruption of the flow of liquid material may impede the ability of the jet to form a negative meniscus at an outlet orifice thereof, as is typically required for reliable performance.

Mounting the build material source substantially away from the jetting head may increase the required length of flexible tubing connecting the source with the jetting head. In addition, movement of the jetting head along multiple axes causes flexing and vibration of the tube which may allow for the formation of an air bubble or other disruption to liquid material flowing within the tube. Accordingly, the supply to the jetting head may be disrupted with a resulting loss in article accuracy or overall production speed.

A further disadvantage of conventional build or support material tanks is that they are typically fixed relative to the apparatus frame. Accordingly, the liquid material may tend to separate into layers under the influence of gravity or the liquid may retain air bubbles. In either case, consistency of operation of the apparatus may be compromised.

SUMMARY OF THE INVENTION

In view of the foregoing background, it is therefore an object of the invention to provide an apparatus and associated method for constructing a three-dimensional article based upon article defining data with high reliability and accuracy, and with high speed of construction.

These and other objects, advantages, and features of the present invention are provided by an apparatus comprising a first positioner for positioning a build material jetting head along a first direction, a second positioner for positioning the first positioner along a second direction so that the jetting head is effectively positionable along the second direction as well, and a build material reservoir being mounted on the first positioner so that a flexible connecting tube need only flex to accommodate positioning of jetting head along the first direction, but not along the second direction. Accordingly, the possibility of disrupting liquid build material delivery to through the flexible tube and to the jetting head is significantly reduced. In addition, the inertia of the jetting head can be kept desirably low for high speed and accurate movement, since the jetting head need not include a connected source of liquid build material. Further, movement of the liquid build material reservoir ensures a homogenous mixture, and also helps to release air bubbles in the liquid build material.

The build material jetting head may preferably dispense build material in a plurality of droplets. For example, the jetting head may be a piezoelectric jet which operates by forming a negative meniscus at an orifice of the jet between droplets. Accordingly, the build material reservoir may be mounted vertically relative to the piezoelectric jet to form the negative meniscus by negative head pressure.

The first positioner may comprise a carriage operatively connected to the second positioner so as to be positionable responsive to operation of the second positioner. A first drive motor is preferably mounted on the carriage, and a first rotatable output shaft is operatively connected to the first drive motor for positioning the jetting head along the first direction responsive to rotation of the first output shaft. Similarly, the second positioner may include a second drive motor, and a second rotatable output shaft operatively connected to the second drive motor. The second motor and output shaft position the first positioner along the second direction responsive to rotation of the second output shaft. Preferably, the first and second directions may be orthogonal to one another so that the jetting head is positionable or translatable in an X-Y plane, for example.

Another aspect of the invention relates to replenishment of the build material reservoir. In particular, the apparatus preferably includes solid build material supply means mounted on an apparatus frame for storing build material in solid form. Docking means, cooperating with the first and second positioners, selectively positioning the build material reservoir adjacent the solid build material supply means, and causes replenishment of build material within the build material reservoir from the solid build material supply means. In addition, a build material level sensor may be provided for cooperating with the docking means to initiate replenishment of the build material reservoir responsive to a low level of build material.

A reservoir heater is preferably connected to the build material reservoir for maintaining the build material contained therein in a liquid state. And a tube heater is preferably provided for heating the flexible tube for maintaining the build material flowing therethrough in a liquid state. The tube heater may be an electrically resistive element extending along the flexible tube.

A platform is preferably provided adjacent the jetting head and upon which the three-dimensional article is constructed. Accordingly, a third positioner may be provided for positioning the platform relative to the jetting head along a third direction orthogonal to both the first and second directions. A processor preferably cooperates with the first, second, and third positioners for moving the jetting head along a predetermined path of travel to construct the three-dimensional article based upon article defining data.

The jetting head may also include positioners for motion in other degrees of freedom to facilitate construction of relatively complicated shapes. The apparatus may include a flip angle positioner for rotatably positioning the jetting head relative to an axis generally parallel to the platform, and a phi angle positioner for rotatably positioning the jetting head relative to an axis generally perpendicular to the platform.

A method aspect of the invention is for making a three-dimensional article based upon article defining data. The method preferably comprises the steps of: positioning a build material jetting head along a first direction using a first positioner; positioning the first positioner along a second direction; supplying liquid build material from a build material reservoir, through a flexible tube, and to the jetting head, with the build material reservoir being mounted on the first positioner; and dispensing build material in a plurality of droplets from the jetting head as the jetting head is positioned along the first and second directions to construct the three-dimensional article based upon the article defining data. Accordingly, the flexible tube need only flex to accommodate positioning of the jetting head along the first direction, but not along the second direction so that the possibility of disrupting the flow of build material is lessened. The build material reservoir is also moved to cause stirring of the liquid build material.

DETAILED DESCRIPTION OF THE PREFERRED EMBODIMENTS

Figure 1:
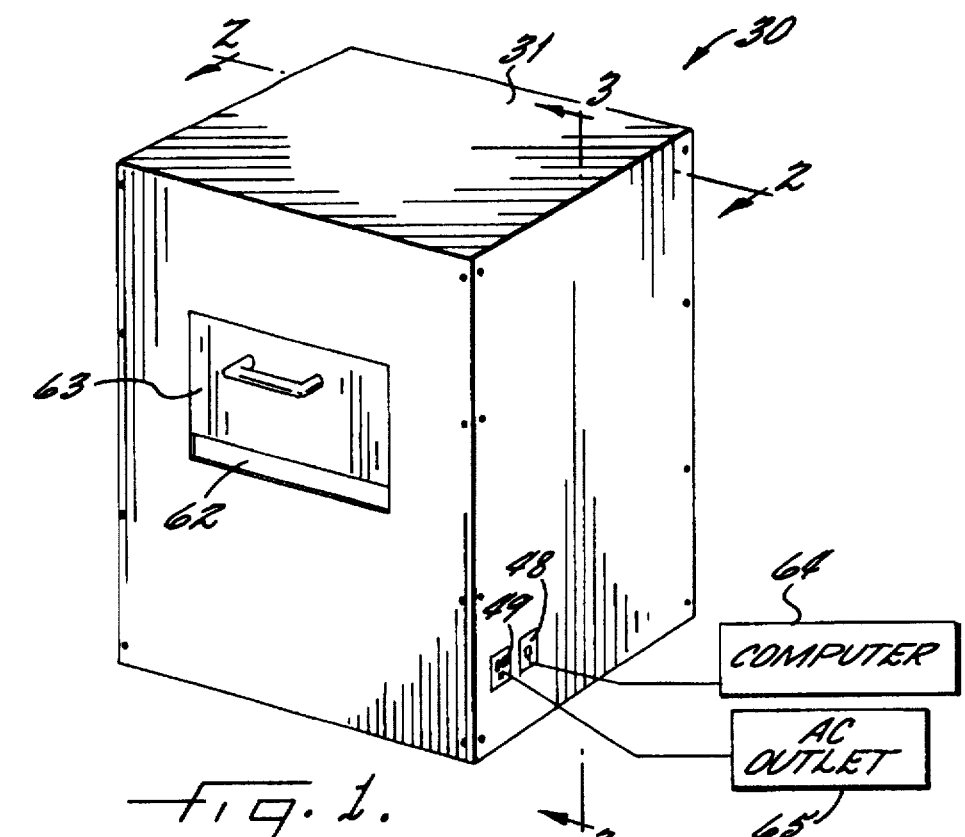
FIG. 1 is a perspective view of the apparatus for forming three-dimensional articles according to the invention.
Figure 4:
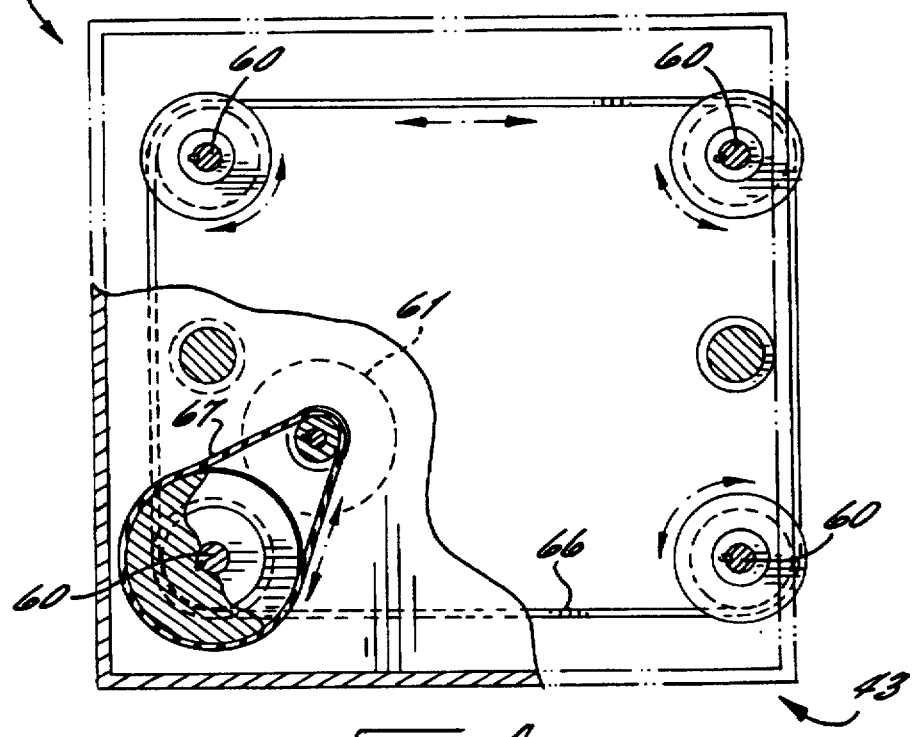
FIG. 4 is a sectional view of the apparatus taken along lines 4—4 of FIG. 2.
Figure 2:
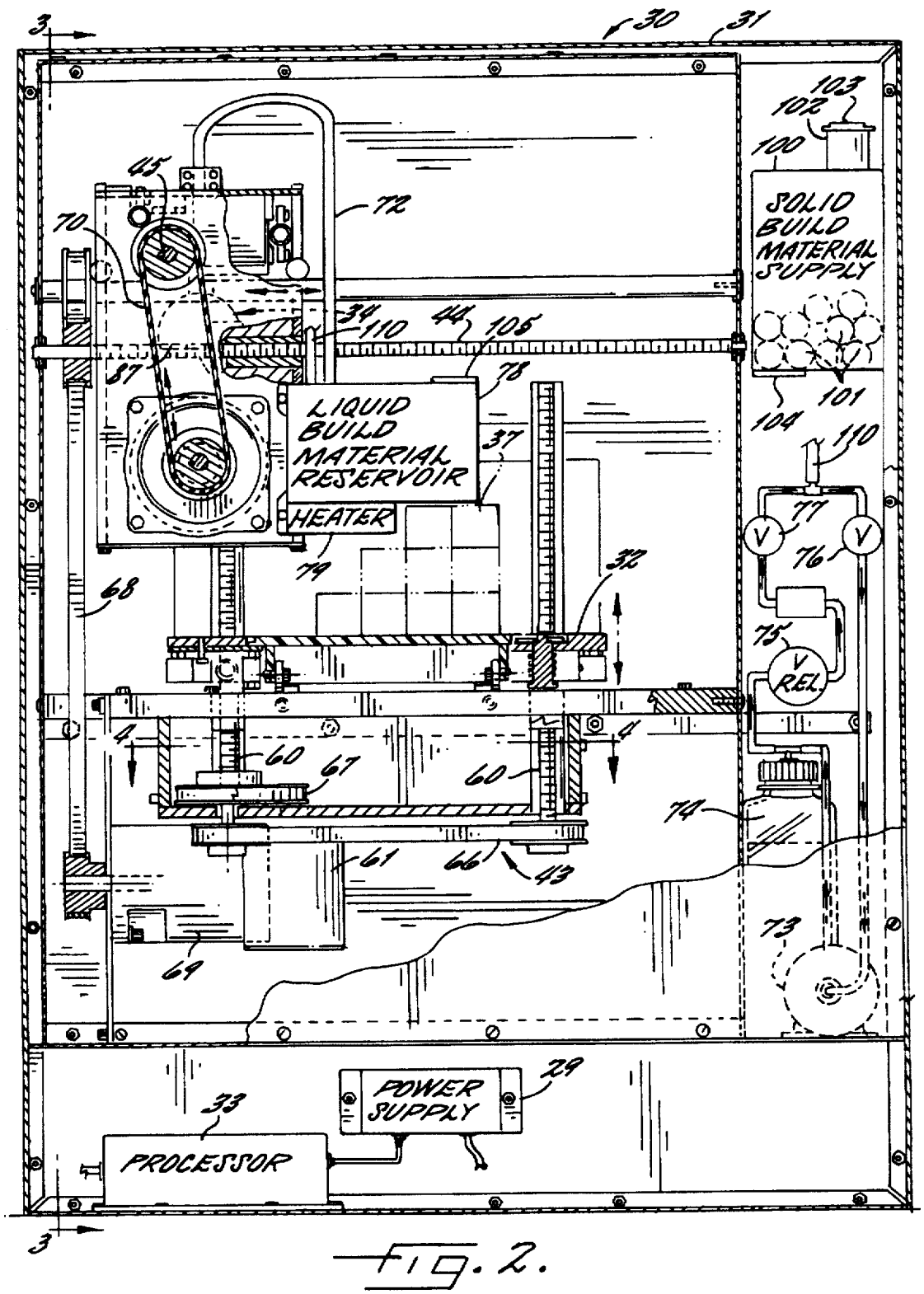
FIG. 2 is a sectional view of the apparatus taken-along lines 2—2 of FIG. 1.
Figure 3:
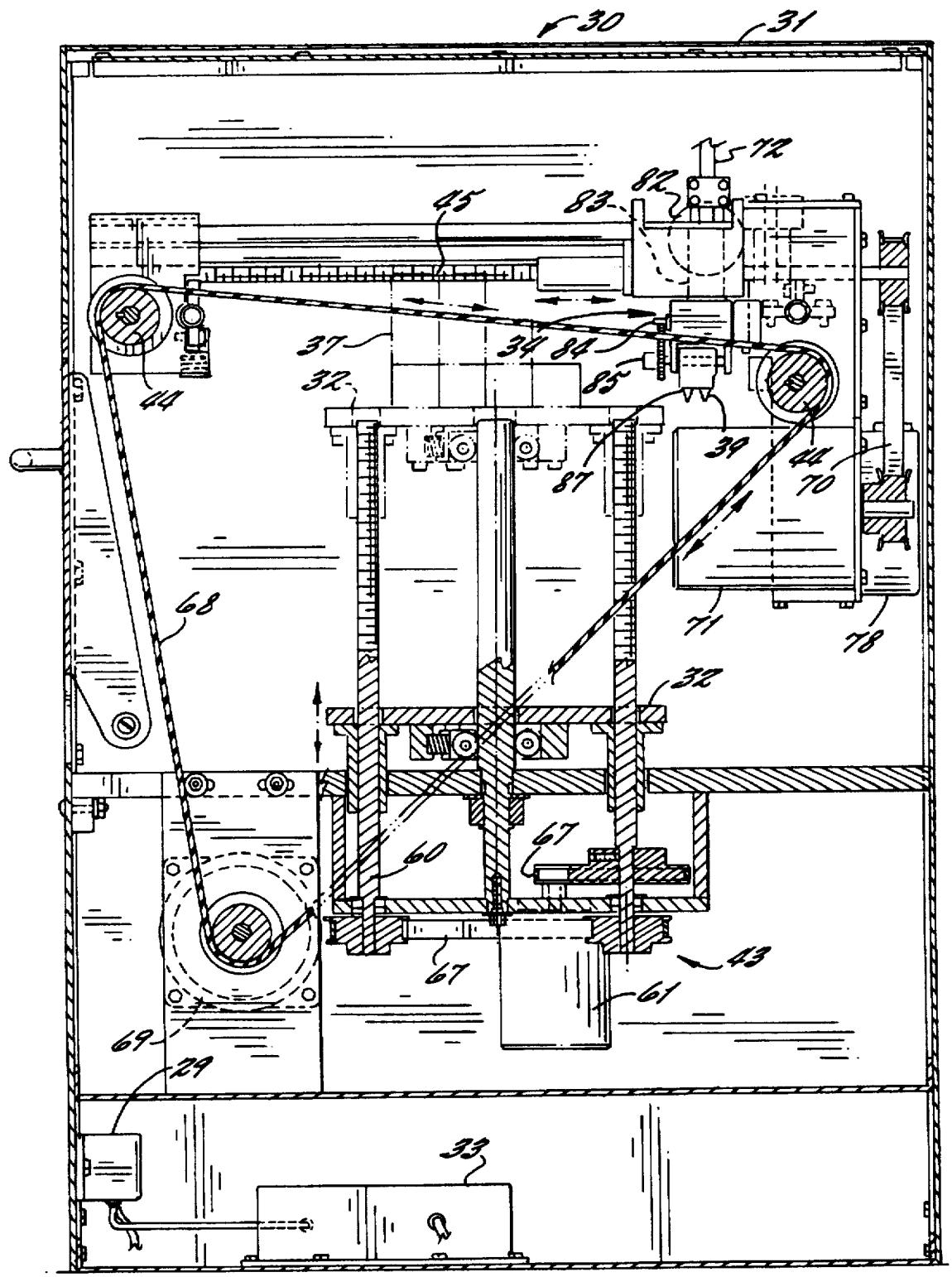
FIG. 3 is a sectional view of the apparatus taken along lines 3—3 of FIG. 2.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1–5, the three-dimensional article manufacturing apparatus 30 according to the invention is now described. The apparatus 30 includes a generally rectangular frame or housing 31 having an access opening 62 closed by a sliding door 63. A power port 49 facilitates electrical connection to an external power source, such as from an AC outlet 65. A computer port 48 allows connection to an external computer 64. An external computer 64, such as a work station or personal computer, may be used to generate a digital data file containing the three-dimensional coordinate data defining an article or model to be built. For example, the data may be from an STL file which defines the article in triangular facets, as would be readily understood by those skilled in the art.

In addition, it will be understood by those having skill in the art that the data file may be transferred to the apparatus by a transferable memory medium such as a magnetic disk or tape, or a microelectronic memory, not shown. Accordingly, the apparatus 30 may be adapted to receive coordinate data from any number of sources having the appropriate electronic data format. If data is transferred by a transferable memory medium, for example, the apparatus 30 may include a disk drive, a tape reader, or other means for reading electronic data from a transferrable memory medium. The apparatus 30 includes a processor 33 which receives the digital data file and translates the coordinate data therein to control signals, as described further herein. The apparatus 30 also includes a power supply 29.

The apparatus 30 includes a platform 32 on which the article 37 is built, and a ballistic jetting head 34 from which droplets of liquid build material are jetted. More particularly, the jetting head 34 may include a piezoelectric jet 39 carried by jetting head 34 for dispensing build material in a plurality of droplets toward the platform 32 to construct the article 37. The build material is normally solid when at the temperature of the interior of the apparatus, but is heated to a liquid for delivery to the jetting head as described in greater detail below. In other words, the heated liquid droplets of build material are jetted from the jetting head 34 to an intended landing position on either the platform 32 or a portion of previously jetted build material. On contact with the platform or previously jetted build material, the heated liquid droplets cool and solidify.

The piezoelectric jet 39 may also be positioned relatively close to the target position so that the build material may, in a sense, not be considered as traveling ballistically. Accordingly, the terms ejected and jetted are also used herein and describe a relatively small gap or no gap. The illustrated piezoelectric jet 39 is but one embodiment of a dispenser for dispensing build material in metered quantities and to precise target landing positions. It being readily understood by those of skill in the art, that other types of build material dispensers are also contemplated by the invention that can meter build material and accurately deliver it to a target position.

In a preferred embodiment, the apparatus 30 includes positioning means for moving the jetting head 34 in relation to the platform 32. Orthogonal screw drive shafts facilitate the movement of the jetting head 34 in the X- and Y-directions relative to the platform 32. As illustrated, a pair of X-axis drive shafts 44, which are driven by X-axis motor 69 and X-axis drive belt 68, facilitate movement of the jetting head 34 in the X-direction. Y-axis drive shaft 45, which is driven by Y-axis drive motor 71 and Y-axis drive belt 70 facilitates movement of the jetting head 34 in the Y-direction. As will be understood by those having skill in the art, movement of the jetting head 34 in the X-Y plane may also be provided by an r/Θ positioner including an arm adapted for radial movement at an angle Θ, and a positioner for positioning the jet at a radius, r, along the arm.

In the illustrated embodiment, relative movement in the Z-direction is provided by a Z-axis positioner 43 which moves the platform 32 up and down in the Z-direction. The Z-axis positioner includes vertical drive shafts 60 which engage the platform 32. The drive shafts 60 are driven by the vertical drive motor 61 and vertical drive belts 66 and 67.

Figure 5:
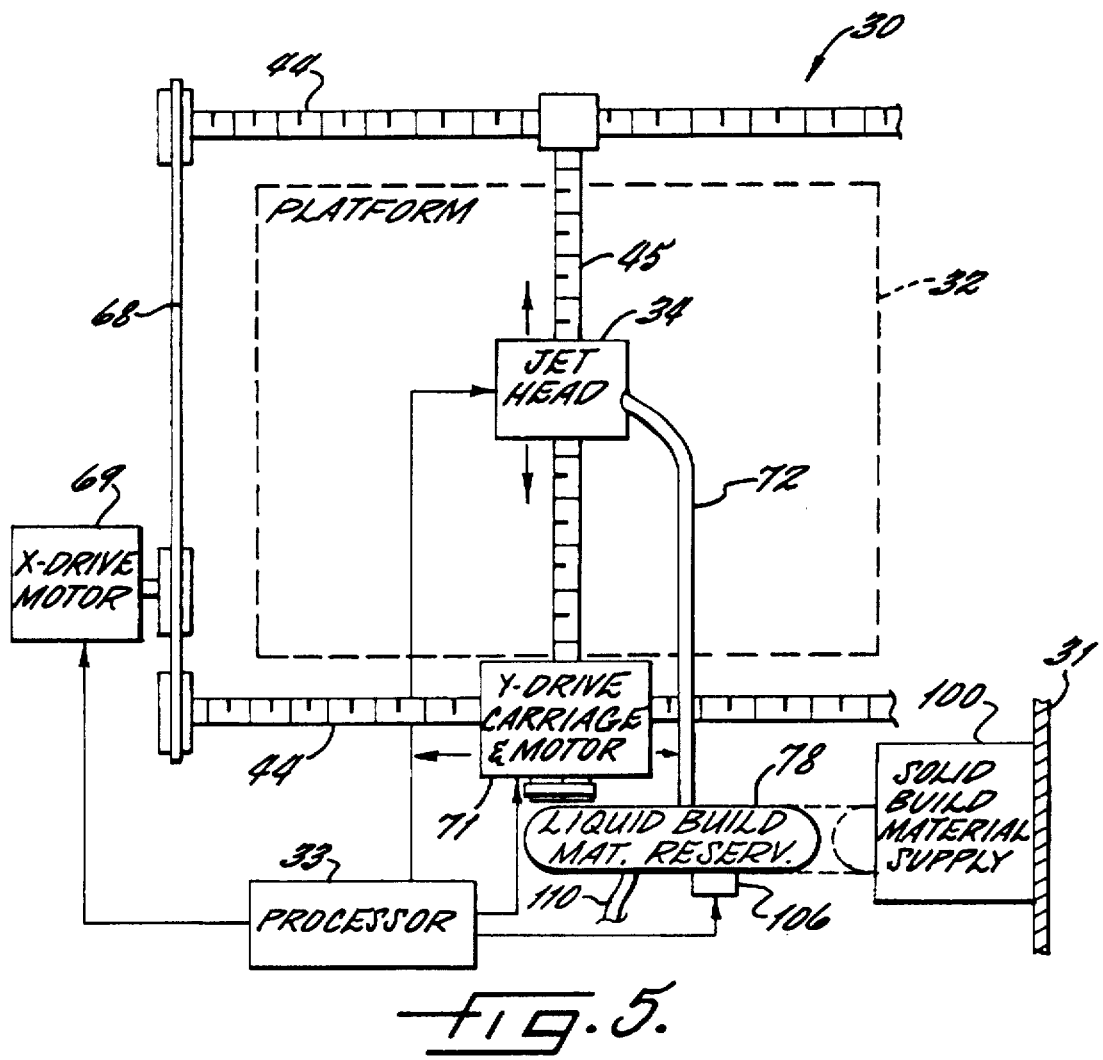
FIG. 5 is a schematic top plan view of a portion of the apparatus according to the invention illustrating positioning of the build material jetting head and delivery of build material thereto.

Referring now more particularly to FIG. 5, the movable build reservoir 78 of the present invention is described in greater detail. The apparatus 10 includes a liquid build material reservoir 78 for supplying liquid build material to the jetting head 34 via a flexible heated tube 72. The build material reservoir 78 may include an electrical resistance heater 79 (FIG. 2) associated therewith for maintaining the build material in the liquid state as would be readily appreciated by those skilled in the art.

The build material reservoir 78 is mounted on the first or Y-direction positioner which includes a movable carriage supporting a first drive motor 71 so that the flexible connecting tube 72 need only flex to accommodate positioning of jetting head 34 along the first or Y-direction, but not along the second or X-direction. Accordingly, the possibility of disrupting liquid build material delivery to through the flexible tube 72 and to the jetting head 34 is significantly reduced. In addition, the inertia of the jetting head 34 can be kept desirably low for high speed and accurate movement, since the jetting head need not include its own source or reservoir of liquid build material. Further, movement of the liquid build material reservoir 78 ensures a homogenous mixture, and also helps to release air bubbles in the liquid build material.

As illustrated, the first and second directions are preferably each linear and orthogonal to one another. In addition, a third or Z-direction positioner 43, as described above, is provided for positioning the 32 platform relative to jetting head 34 along a third direction orthogonal to both the first and second directions. The processor 33 preferably cooperates with the first, second, and third positioners for moving the jetting head 34 along a predetermined path of travel to construct the three-dimensional article based upon article defining data.

Another aspect of the apparatus 30 relates to replenishment of the liquid build material reservoir 78. In particular, the apparatus 30 also preferably includes a solid build material supply means 100 mounted on a portion of the apparatus frame 31. The solid build material supply means 100 stores build material in solid form, such as in the illustrated form of spheres 101, although other shapes and sizes are contemplated by the invention as would be readily understood by those skilled in the art. The solid build material supply means 100 may also include a filler tube 102 and cap 103 as shown to permit replenishment of solid build material by an operator.

The apparatus 30 preferably comprises docking means, cooperating with said first and second positioners, for selectively positioning the build material reservoir 78 adjacent the solid build material supply means 100 and for replenishing build material within the build material reservoir from the solid build material supply means. For example, the liquid build material reservoir 78 and the solid build material supply means 100 may include a corresponding covered openings 105, 104 (FIG. 2) which mate and cooperatively function for permitting transfer of solid build material 101 to the build material reservoir 78. Once in the liquid build material reservoir 78, the solid build material is quickly converted to liquid by the heater 79 and any liquid build material within the reservoir.

The apparatus 30 preferably further comprises a build material level sensor 106 (FIG. 5) associated with build material reservoir 78 and cooperating with the docking means for initiating replenishment of the build material reservoir responsive to a low level of build material within the build material reservoir. In other terms, the processor 33 preferably provides the control functions for operating the positioners in response to the sensed low level of liquid build material to replenish the supply of build material within the reservoir 78.

The build material reservoir 78 may also be connected to a pneumatic system via a tube 110 for applying either vacuum or pressure to the liquid build material. The pneumatic system includes a pump 73, an accumulator 74, a pressure regulator 75, a purge valve 76, and a fill valve 77. The pneumatic system is for emptying and filling the piezoelectric jet 39 and heated tube 72 responsive to certain operating conditions as described further in copending U.S. patent application Ser. No. 08/326,015, entitled "Apparatus and Method for Dispensing Build Material to Make a Three-Dimensional Article," assigned to the assignee of the present invention, and the entire disclosure of which is incorporated herein by reference.

A relatively constant level of liquid build material may be maintained in the build material reservoir 78, so that the surface level of the liquid build material in the build material reservoir 78 is maintained at a relatively constant elevation with respect to the piezoelectric build material jet 39. In preferred embodiments, the jet 39 may be situated above the surface level of the liquid build material, such as about 1 to 3 inches above the surface level of the liquid build material, to thereby maintain a negative meniscus at the orifice of the piezoelectric jet 39. Alternatively, a vacuum could be applied to the liquid build material, such as by coupling a vacuum source to the reservoir 78. The negative meniscus increases the accuracy and uniformity of successive jetted droplets and also reduces undesirable accumulation of build material adjacent the orifice 40 of the jet 39.

Figure 6:
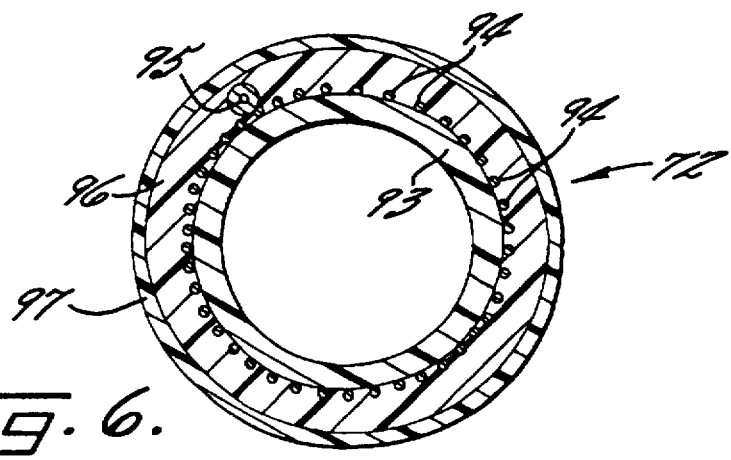
FIG. 6 is a greatly enlarged cross-sectional view of the heated tube connecting the build material reservoir to the build material jetting head.

As illustrated in FIG. 6, the flexible tube 72 may include a flexible interior layer 93, formed of a durable material such as VITON. The interior layer may be surrounded by a thermally conductive layer, such as the illustrated wire mesh braid 94. The wire may be copper which is a good thermal conductor. An insulated electrically resistive wire heating element 95 may be spirally wrapped around the wire mesh braid 94. The heating element may be Nichrome wire surrounded by an electrical insulator. The tube 72 is thus uniformly heated by passing an electrical current through the heating element 95 with the braided wire layer serving to distribute heat. An intermediate layer 96 of thermally insulating material, such as fiberglass, surrounds the heating element 95 and the wire mesh braid 94. The structure is surrounded by an outer protective layer 97, such as provided by heat shrink tubing.

Figure 7:
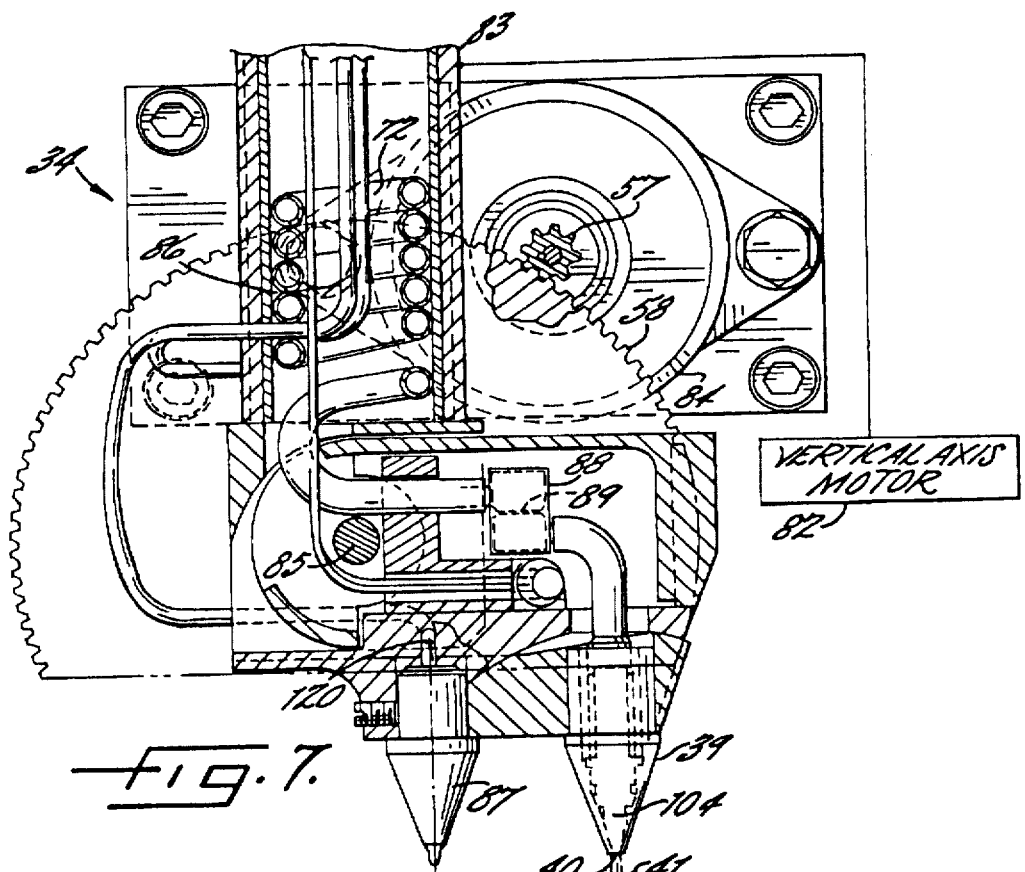
FIG. 7 is a greatly enlarged side view, partially in section, of a portion of the apparatus according to the invention illustrating the build material jetting head positioned to have a vertical firing direction.
Figure 8:
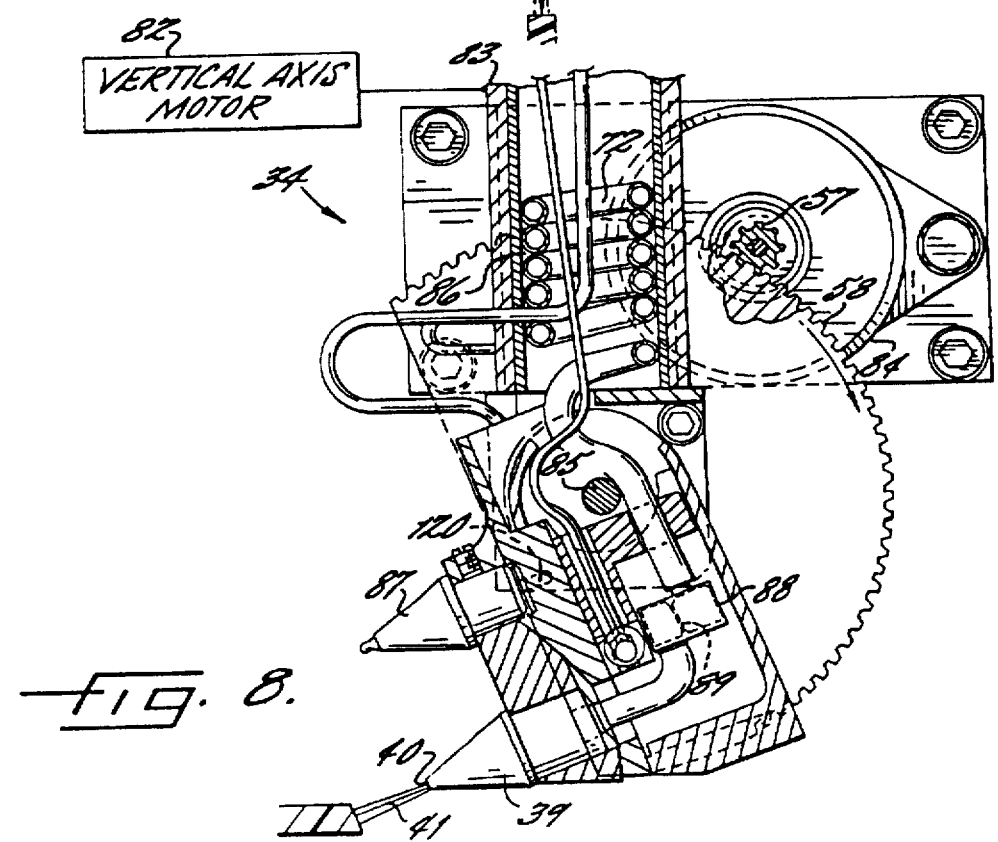
FIG. 8 is a greatly enlarged side view, partially in section, of a portion of the apparatus according to the invention illustrating the build material jetting head positioned to have a near horizontal firing direction based upon rotation about a horizontal axis or flip angle positioning.
Figure 9:
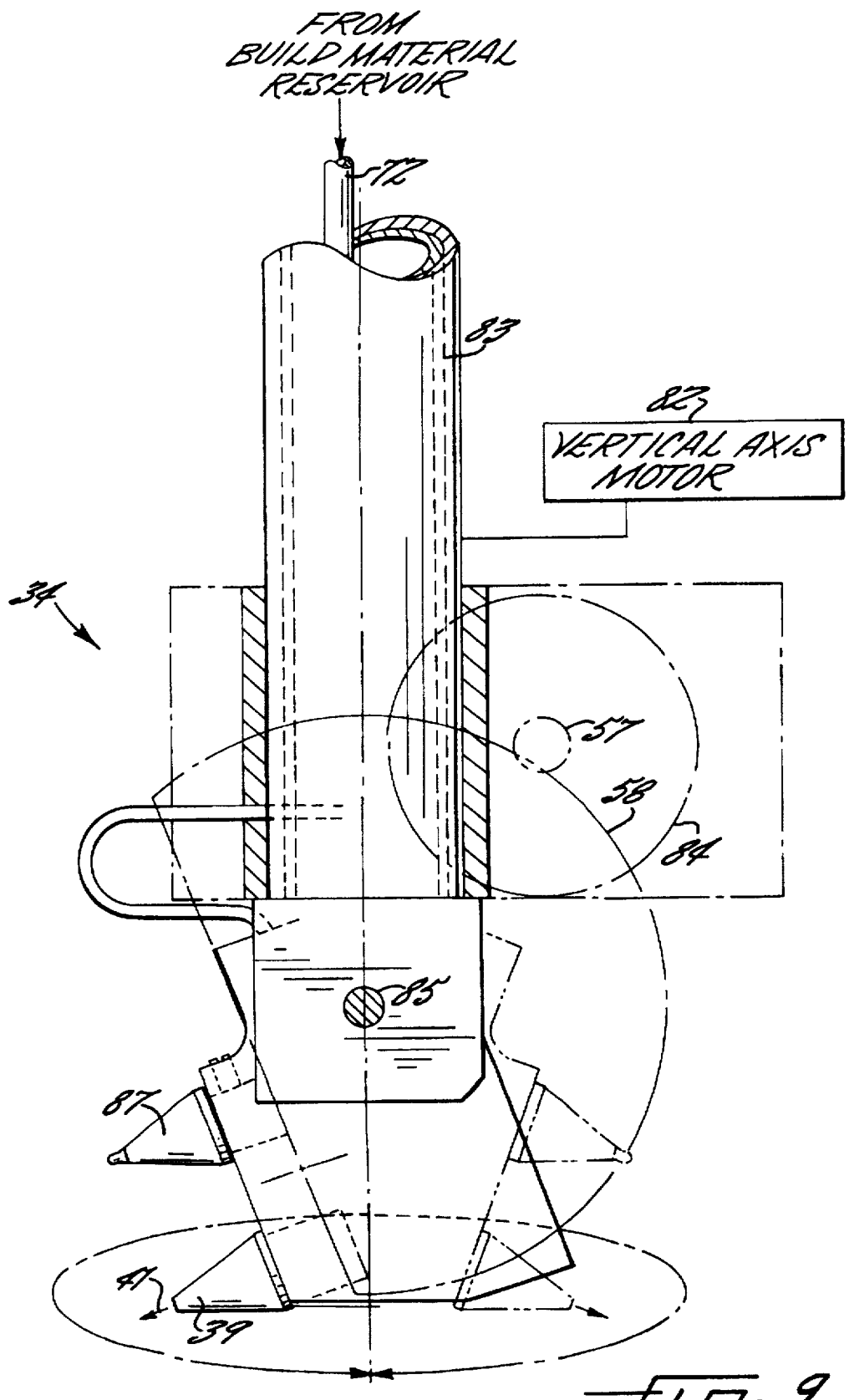
FIG. 9 is a schematic side view of the build material jetting head as shown in FIGS. 7 and 8 illustrating rotation about a vertical axis, that is, phi angle positioning.

As illustrated perhaps best in FIGS. 7 and 8, the jetting head 34 includes means for rotating the piezoelectric jet 39 and a heated body 87 for normalizing surface portions about a horizontal axis or to a desired flip angle. The axis is defined by a horizontal shaft 85 which is driven by an associated motor 84 through drive gears 57 and 58. Accordingly, the firing direction 41 may be adjusted from vertical, as shown in FIG. 7, to near horizontal as shown in FIG. 8. FIGS. 7 and 8 also further illustrate the positioning means which rotates the jetting head 34 about a vertical axis on shaft 83 for rotation to a desired phi angle of rotation. This rotation is powered by vertical axis rotation motor 82 shown in schematic form in FIG. 9.

The heated body 87 is used to periodically normalize surface portions of a partially completed wall. The heated body is further described in copending U.S. patent application Ser. No. 08/326,009, now U.S. Pat. No. 5,572,431 entitled "Apparatus and Method for Thermal Normalization in Three-Dimensional Article Manufacturing," assigned to the assignee of the present invention, and the entire disclosure of which is incorporated herein by reference.

The jetting head 34 preferably carries both the piezoelectric jet 39 and the heated body 87. Both of these elements are heated to a temperature above the melting point of the build material. This heat may be generated by an electrical heating element. In a preferred embodiment, an electrical heater, such as a resistive wire 120, is operatively connected to the heated body 87. Accordingly, the jet 39 receives heated liquid build material from the delivery tube 72 and maintains the build material in a liquid state prior to jetting.

Liquid build material is supplied to the jet 39 through the flexible tube 72. The tube 72 is formed into a spiral coil 86 within the vertical shaft 83 to enable rotation of the jetting head 34 without restricting the flow of build material through the tube and without requiring a rotatable joint and associated seal. The build material tube 72 enters the jetting head through the shaft 83. By rotating the shaft 83, the entire jetting head 34, including the jet 39 and the heated body 87, may be rotated 360 degrees about a vertical axis by the vertical axis motor 82.

A build material passage 104 within the piezoelectric jet 39 provides fluid communication between the baffle 88 and the orifice 40. As discussed above, a heating element, such as an electrical resistance wire, may be used to maintain the build material in a liquid state as it passes from the conduit 72 to the baffle 88, tubular connection 106, and jet 39.

The orifice 40 of the jet 39 is maintained at a predetermined elevation above the surface level of liquid build material in the build material reservoir 78 in the illustrated embodiment. Accordingly, a predetermined negative pressure is exerted upon the liquid build material at the orifice 40. The orifice 40 has a predetermined diameter such that the liquid build material maintains a negative meniscus at the orifice under the influence of the negative pressure. Accordingly, the negative meniscus increases the accuracy and uniformity of successive ballistically jetted droplets and also reduces undesirable accumulation of build material adjacent the orifice 40 of the jet 39.

The piezoelectric jet 39 may include a hollow body including a plastic insert defining a build material flow passage, and a containing a piezoelectric element, in turn, secured within the body by an epoxy. Upon application of an electric signal to the piezoelectric element, the piezoelectric element either contracts or expands depending on the polarity of the signal. In response, an acoustic wave is generated in the liquid build material located in the build material flow passage. This acoustic wave is transmitted through the liquid build material to the negative meniscus at the orifice 40. As a result of the acoustic wave, a droplet of heated liquid build material having a predetermined volume is jetted or ejected from the orifice 40 in firing direction 41 and at a predetermined velocity. The volume and velocity of the droplet are functions of the diameter of the orifice; the size of the piezoelectric element; the intensity and polarity of the electrical signal; and the temperature, surface tension and viscosity of the liquid build material as would be readily understood by those skilled in the art.

In preferred embodiments, it has been found that stable operation of the piezoelectric jet 39 can be sustained at frequencies of up to 12 KHz. Accordingly, the piezoelectric jet 39 is capable of firing 12,000 droplets per second wherein each droplet has a predetermined volume, velocity and firing direction. Other jetting means are also contemplated by the invention as would be readily understood by those skilled in the art. The jet 39 may also be operated to jet droplets in relatively quick succession, that is, in bursts of multiple droplets, so that the droplets in each burst collectively coalesce or solidify at an intended landing position as described in copending U.S. patent application Ser. No. 08/325,889, now U.S. Pat. No. 5,555,176 entitled "Apparatus and Method for Making Three-Dimensional Articles Using Bursts of Droplets," assigned to the assignee of the present invention, and the entire disclosure of which is incorporated herein by reference.

The build material typically melts at a temperature of from about 50° C. to 250° C., cools quickly and adheres to itself, and has a low rate of shrinkage. Such a build material preferably comprises a solution of a resin having a hydroxyl number of from about 5 to 1000, and a molecular weight greater than about 500, dissolved in at least one primary aromatic sulfonamide preferably having a melting point greater than about 25° C. The rheology of the build material is preferably such that a droplet remelts portions of deposited material so as to form a flowable bead. Suitable build materials are further described in commonly assigned copending U.S. patent application Ser. No. 08/325,694, now abandoned entitled "Build Material for Forming a Three-Dimensional Article," assigned to the assignee of the present invention, and the entire disclosure of which is incorporated herein by reference. In addition, other techniques for jetting or ejecting build material are further described in copending U.S. patent application Ser. No. 08/326,004, entitled "Apparatus and Method for Making Three-Dimensional Article," assigned to the assignee of the present invention, U.S. Pat. No. 5,633,021 and the entire disclosure of which is incorporated herein by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for making a three-dimensional article based upon article defining data, said apparatus comprising:
    a build material jetting head for dispensing build material in a plurality of droplets;
    a first positioner for positioning said jetting head along a first direction;
    a second positioner for positioning said first positioner along a second direction transverse to the first direction so that said jetting head is thereby positionable along the second direction for dispensing build material to facilitate construction of a three-dimensional article based upon article defining data;
    a build material reservoir for containing liquid build material;
    a flexible tube connecting said build material reservoir in fluid communication with said jetting head for delivering liquid build material from said build material reservoir to said jetting head;
    said build material reservoir being mounted on said first positioner and movable therewith along the second direction to cause mixing of the liquid build material and so that said flexible tube need only flex to accommodate positioning of said jetting head along the first direction, but not along the second direction; and
    docking means, cooperating with said first and second positioners, for selectively positioning said build material reservoir adjacent solid build material supply means which stores build material in solid form and for replenishing build material within said build material reservoir from said solid build material supply means.

2. An apparatus according to claim 1 wherein said jetting head comprises:
    a piezoelectric jet; and wherein said build material reservoir is mounted vertically relative to said piezoelectric jet.

3. An apparatus according to claim 1 wherein said first positioner comprises:
    a carriage operatively connected to said second positioner so as to be positionable responsive to operation of said second positioner;
    a first drive motor mounted on said carriage; and
    a first rotatable output shaft operatively connected to said first drive motor for positioning said jetting head along the first direction responsive to rotation of said first output shaft.

4. An apparatus according to claim 1 wherein said second positioner comprises:
    a second drive motor; and
    a second rotatable output shaft operatively connected to said second drive motor for positioning said first positioner along the second direction responsive to rotation of said second output shaft.

5. An apparatus according to claim 1 wherein said first positioner includes means for positioning said jetting head along a first linear direction, and wherein said second positioner includes means for positioning said first positioner along a second linear direction orthogonal to the first linear direction.

6. An apparatus according to claim 1 further comprising:
    a frame; and
    wherein said solid build material supply means is mounted on said frame for storing build material in solid form.

7. An apparatus according to claim 6 further comprising a build material level sensor associated with said build material reservoir and cooperating with said docking means for initiating replenishment of said build material reservoir responsive to a low level of build material within said build material reservoir.

8. An apparatus according to claim 1 further comprising a reservoir heater connected to said build material reservoir for maintaining the build material contained therein in a liquid state.

9. An apparatus according to claim 1 further comprising a tube heater for heating said flexible tube for maintaining the build material flowing therethrough in a liquid state.

10. An apparatus according to claim 9 wherein said tube heater comprises an electrically resistive element extending along said flexible tube.

11. An apparatus according to claim 1 further comprising:
    a platform adjacent said jetting head and upon which the three-dimensional article is constructed; and a third positioner for positioning said platform relative to said jetting head along a third direction transverse to both the first and second directions.

12. An apparatus according to claim 11 further comprising a processor cooperating with said first, second, and third positioners for moving said jetting head along a predetermined path of travel to construct the three-dimensional article based upon article defining data.

13. An apparatus according to claim 12 further comprising:
   a flip angle positioner for rotatably positioning said jetting head relative to an axis generally parallel to said platform; and
   a phi angle positioner for rotatably positioning said jetting head relative to an axis generally perpendicular to said platform.

14. An apparatus for making a three-dimensional article based upon article defining data, said apparatus comprising:
   a platform upon which the three-dimensional article is constructed;
   a build material dispensing head for dispensing build material;
   a first positioner for positioning said dispensing head along a first direction relative to said platform;
   a second positioner for positioning said first positioner along a second direction transverse to the first direction;
   a build material reservoir mounted on said first positioner and movable therewith for containing liquid build material;
   a flexible tube connecting said build material reservoir in fluid communication with said dispensing head for delivering liquid build material from said build material reservoir to said dispensing head;
   a third positioner for positioning said platform relative to said dispensing head along a third direction transverse to both the first and second directions so that said dispensing head is positionable to construct a three-dimensional article based upon the article defining data; and
   docking means, cooperating with said first and second positioners, for selectively positioning said build material reservoir adjacent solid build material supply means which stores build material in solid form and for replenishing build material within said build material reservoir from said solid build material supply means.

15. An apparatus according to claim 14 wherein said dispensing head comprises a piezoelectric jet; and wherein said build material reservoir is mounted vertically relative to said piezoelectric jet.

16. An apparatus according to claim 14 wherein said first positioner comprises:
   a carriage operatively connected to said second positioner so as to be positionable responsive to operation of said second positioner;
   a first drive motor mounted on said carriage; and
   a first rotatable output shaft operatively connected to said first drive motor for positioning said dispensing head along the first direction responsive to rotation of said first output shaft.

17. An apparatus according to claim 14 wherein said second positioner comprises:
   a second drive motor; and
   a second rotatable output shaft operatively connected to said second drive motor for positioning said first positioner along the second direction responsive to rotation of said second output shaft.

18. An apparatus according to claim 14 wherein said first positioner includes means for positioning said dispensing head along a first linear direction; wherein said second positioner includes means for positioning said first positioner along a second linear direction orthogonal to the first linear direction; and wherein said third positioner comprises means for positioning said dispensing head along a third linear direction orthogonal to both the first and second linear directions.

19. An apparatus according to claim 14 further comprising:
   a frame; and
   wherein said solid build material supply means is mounted on said frame for storing build material in solid form.

20. An apparatus according to claim 19 further comprising a build material level sensor associated with said build material reservoir and cooperating with said docking means for initiating replenishment of said build material reservoir responsive to a low level of build material within said build material reservoir.

21. An apparatus according to claim 14 further comprising a reservoir heater connected to said build material reservoir for maintaining the build material contained therein in a liquid state.

22. An apparatus according to claim 14 further comprising a tube heater for heating said flexible tube for maintaining the build material flowing therethrough in a liquid state.

23. An apparatus for making a three-dimensional article based upon article defining data, said apparatus comprising:
   a frame;
   solid build material supply means mounted on said frame for storing build material in solid form;
   a build material dispensing head for dispensing build material;
   a first positioner for positioning said dispensing head along a first direction relative to said frame;
   a second positioner for positioning said first positioner along a second direction relative to said frame;
   a build material reservoir mounted on said first positioner and movable therewith for containing liquid build material;
   a flexible tube connecting said build material reservoir in fluid communication with said dispensing head for delivering liquid build material from said build material reservoir to said dispensing head; and
   docking means, cooperating with said first and second positioners, for selectively positioning said build material reservoir adjacent said solid build material supply means and for replenishing build material within said build material reservoir from said solid build material supply means.

24. An apparatus according to claim 23 further comprising a build material level sensor associated with said build material reservoir and cooperating with said docking means for initiating replenishment of said build material reservoir responsive to a low level of build material within said build material reservoir.

25. An apparatus according to claim 23 wherein said dispensing head comprises a piezoelectric jet;
   and wherein said build material reservoir is mounted vertically relative to said piezoelectric jet.

26. An apparatus according to claim 23 wherein said first positioner comprises:

a carriage operatively connected to said second positioner so as to be positionable responsive to operation of said second positioner;

a first drive motor mounted on said carriage; and a first rotatable output shaft operatively connected to said first drive motor for positioning said dispensing head along the first direction responsive to rotation of said first output shaft.

27. An apparatus according to claim 23 wherein said second positioner comprises:

a second drive motor; and a second rotatable output shaft operatively connected to said second drive motor for positioning said first positioner along the second direction responsive to rotation of said second output shaft.

28. An apparatus according to claim 23 wherein said first positioner includes means for positioning said dispensing head along a first linear direction, and wherein said second positioner includes means for positioning said first positioner along a second linear direction orthogonal to the first linear direction.

29. An apparatus according to claim 23 further comprising a reservoir heater connected to said build material reservoir for maintaining the build material contained therein in a liquid state.

30. An apparatus according to claim 23 further comprising a tube heater for heating said flexible tube for maintaining the build material flowing therethrough in a liquid state.

31. A method for making a three-dimensional article based upon article defining data, the method comprising the steps of:

positioning a build material jetting head along a first direction using a first positioner;

positioning the first positioner along a second direction so that the jetting head is also positioned along the second direction;

supplying liquid build material from a build material reservoir, through a flexible tube, and to the jetting head, with the build material reservoir being mounted on the first positioner to cause mixing of the liquid build material and so that the flexible tube need only flex to accommodate positioning of the jetting head along the first direction, but not along the second direction;

dispensing build material in a plurality of droplets from the jetting head as the jetting head is positioned along the first and second directions to facilitate construction of a three-dimensional article based upon the article defining data;

selectively positioning the build material reservoir adjacent solid build material supply means for storing build material in solid form; and replenishing build material within the build material reservoir from the solid build material supply means.

32. A method according to claim 31 wherein the jetting head comprises:

a piezoelectric jet;

and further comprising the step of vertically mounting the build material reservoir relative to an orifice of the piezoelectric jet.

33. A method according to claim 31 wherein the step of positioning the jetting head comprises positioning same along a first linear direction, and wherein the step of positioning the first positioner along a second direction comprises positioning same along a second linear direction orthogonal to the first linear direction.

34. A method according to claim 31 wherein the step of selectively positioning the build material reservoir comprises the steps of:

sensing a level of liquid build material within the build material reservoir; and initiating replenishment of the build material reservoir responsive to a low level of build material within the build material reservoir.

35. A method according to claim 31 further comprising the step of maintaining build material contained in the build material reservoir in a liquid state.

36. A method according to claim 31 further comprising the step of maintaining build material flowing through the flexible tube in a liquid state.

37. A method according to claim 31 wherein the step of dispensing build material comprises dispensing same to construct the three-dimensional article on a platform; and further comprising the step of positioning the platform relative to the jetting head along a third direction transverse to both the first and second directions.

38. An apparatus for making a three-dimensional article based upon article defining data, said apparatus comprising:

a frame;

solid build material supply means mounted on said frame for storing a build material in solid form;

a build material jetting head for dispensing build material in a plurality of droplets;

a first positioner for positioning said jetting head along a first direction relative to said frame;

a second positioner for positioning said first positioner along a second direction transverse to the first direction so that said jetting head is thereby positionable along the second direction for dispensing build material to facilitate construction of a three-dimensional article based upon article defining data;

a build material reservoir for containing liquid build material;

a flexible tube connecting said build material reservoir in fluid communication with said jetting head for delivering liquid build material from said build material reservoir to said jetting head;

said build material reservoir being mounted on said first positioner and movable therewith along the second direction to cause mixing of the liquid build material and so that said flexible tube need only flex to accommodate positioning of said jetting head along the first direction, but not along the second direction; and docking means, cooperating with said first and second positioners, for selectively positioning said build material reservoir adjacent said solid build material supply means and for replenishing build material within said build material reservoir from said solid build material supply means.

39. An apparatus according to claim 38 further comprising a build material level sensor associated with said build material reservoir and cooperating with said docking means for initiating replenishment of said build material reservoir responsive to a low level of build material within said build material reservoir.

40. An apparatus for making a three-dimensional article based upon article defining data, said apparatus comprising:

a frame;

solid build material supply means mounted on said frame for storing a build material in solid form;

a platform mounted to said frame upon which the three-dimensional article is constructed;

a build material dispensing head for dispensing build material;

a first positioner for positioning said dispensing head along a first direction relative to said platform;

a second positioner for positioning said first positioner along a second direction transverse to the first direction;

a build material reservoir mounted on said first positioner and movable therewith for containing liquid build material;

a flexible tube connecting said build material reservoir in fluid communication with said dispensing head for delivering liquid build material from said build material reservoir to said dispensing head;

a third positioner for positioning said platform relative to said dispensing head along a third direction transverse to both the first and second directions so that said dispensing head is positionable to construct a three-dimensional article based upon the article defining data; and docking means, cooperating with said first and second positioners, for selectively positioning said build material reservoir adjacent said solid build material supply means and for replenishing build material within said build material reservoir from said solid build material supply means.

41. An apparatus according to claim 40 further comprising a build material level sensor associated with said build material reservoir and cooperating with said docking means for initiating replenishment of said build material reservoir responsive to a low level of build material within said build material reservoir.

* * * * *